United States Patent [19]
Palathingal

[11] Patent Number: 5,838,505
[45] Date of Patent: Nov. 17, 1998

[54] DIVIDED-REFLECTION METHOD OF WIDE-ANGLE OBSERVATION AND WIDE-ANGLE VIEW AUTOMOBILE MIRROR

[76] Inventor: Jose C. Palathingal, 424 Guadarrama Lane, Miradero Hills, Mayaguez, Puerto Rico, 00680

[21] Appl. No.: 613,266

[22] Filed: Mar. 8, 1996

[51] Int. Cl.⁶ .............................. G02B 5/08; G02B 5/26; G02B 27/14; G02B 1/10
[52] U.S. Cl. ................. 359/839; 359/840; 359/841; 359/584; 359/586; 359/833; 359/866
[58] Field of Search .................... 359/839, 840, 359/841, 845, 850, 584, 586, 587, 629, 630, 631, 865, 883, 884, 833, 838, 864, 607, 608, 609, 639, 640

[56] References Cited

U.S. PATENT DOCUMENTS

| | | | |
|---|---|---|---|
| 3,084,596 | 4/1963 | Radin | 359/833 |
| 4,322,130 | 3/1982 | Ito et al. | 359/584 |
| 4,411,492 | 10/1983 | Bluege | 359/833 |
| 4,674,850 | 6/1987 | Blom | 359/866 |
| 5,159,490 | 10/1992 | Amano et al. | 358/584 |
| 5,491,580 | 2/1996 | O'Meara | 359/584 |

FOREIGN PATENT DOCUMENTS

| | | | |
|---|---|---|---|
| 55-355051636 | 4/1980 | Japan | 359/866 |
| 404263202 | 9/1992 | Japan | 359/866 |
| 2254832 | 10/1992 | United Kingdom | 359/850 |

*Primary Examiner*—Paul M. Dzierzynski
*Assistant Examiner*—Mohammad Y. Sikder
*Attorney, Agent, or Firm*—John Ryznic

[57] ABSTRACT

A method of widening the directional range of view of a mirror device without enlarging the surface area of the device by suitably combining a number of partially-reflecting surfaces includes provision to avoid discontinuities and overlaps in the field of view. It also makes it possible for the viewer to visually identify an image with the particular reflector that generates the image seen in the image field and hence relate it to a zone of the field of visibility wherein the object is located. A device incorporating the method can be useful as a side-view mirror of an automobile.

7 Claims, 6 Drawing Sheets

DIVIDED-REFLECTION METHOD OF WIDE-ANGLE OBSERVATION AND WIDE-ANGLE VIEW AUTOMOBILE MIRROR

FIELD OF THE INVENTION

The invention relates to a mirror device comprising a stack of a plurality of simultaneously-functional reflecting surfaces combining without discontinuity or overlap the distinct object fields of visibility offered by the individual reflecting surfaces, and particularly of broadening the directional range of vision accessible to a vehicle driver looking into a road-view mirror.

BACKGROUND OF THE INVENTION

An ordinary observation mirror presents a finite directional range of view to an observer. The range depends on the shape, size and positioning of the mirror. In practical situations, the size of a mirror that can be accommodated may be limited by physical constraints. For example, the floor-observation mirrors used indoors in stores and offices shall be preferably of small dimensions, but providing the observer as large a directional range of view as possible. The same is true of corner-view mirrors employed in buildings and pathways. Attachments of viewing instruments aimed at increasing the directional range of view shall also be desiredly of small sizes. The conventional approach of achieving a large directional range of view by employing reflectors and lenses having curved surfaces suffers from the disadvantage of causing incorrect perceptions to the observer of the distance and size of the object in view. This disadvantage makes it undesirable to employ curved surfaces for reflectors in several applications. For example, a side-view mirror of an automobile commonly employs a plane-surfaced reflector. Since the device shall not be projecting much physically beyond the surface of the automobile body, it is made small, although the small size limits the directional range of view significantly. These mirrors therefore leave out of visibility a section of the road that is important to be in view. This section, which is called the blind region, may cover an object of interest located on the side in close vicinity. The driver of the automobile cannot therefore see in the side-view mirror the said side object which could be another vehicle trying to overtake on the side, a fact that contributes to numerous road accidents.

The current common practice of avoiding the blind region is to attach within the space of the reflecting surface of the plane side-view mirror a small separate curved mirror that allows for a separate view. However, this has serious disadvantages; the curved mirror is small, hence looking into it under driving conditions, while also looking into the surrounding plane mirror is strenuous. Besides, it is curved so that it can give an incorrect sense to the automobile driver of the distance and size of the object on the side.

Mirrors have been designed for rear view that combine two plane-reflector glass sheets, one of which will be brought to a suitable orientation for view during day time, and the other during night time. An example of such a mirror device is disclosed in U.S. Pat. No. 1,808,740 to Weatherbee. According to this patent, a plane glass sheet which is silvered for total reflection is brought into the functional position for day-time use of the device. During night use, another sheet which is inclined to the first by a few degrees of arc and is nonsilvered is brought into the functional position. Only one of the reflectors is functional at a time. Modifications and improvements have been made regarding the design and operating techniques of such day-and-night rear-view mirrors. In U.S. Pat. No. 2,640,394 to Bertell et al, disclosure is made of a sturdy mounting mechanism that facilitates the use of the mirror under driving conditions. In U.S. Pat. No. 3,815,976 to Kurz, Jr., an assembly of the mirror device especially adapted for external mounting on vehicles is disclosed. Rear-view mirrors enabling wide-range view have also been invented. An example is disclosed in U.S. Pat. No. 4,738,519 to Stewart. In this patent, the mirror device is elongated in size. Because of their elongated size, however, they are not suitable for external mounting as required for side view. Day-and-night mirrors in the form of a single sheet of glass with two plane surfaces, front and rear, at a mutual inclination, with the front surface unsilvered and the rear surface fully silvered for total reflection, the former of which is brought to function during night time and the other during day time, thus having only one surface functioning at a time, have found common place in the current market as a rear-view mirror. These do not present a wide-angle view to the driver.

SUMMARY OF THE INVENTION

It is therefore an object of this invention to provide a method of widening the object field of visibility presented by a mirror device without enlarging the surface dimensions, by combining the object fields of visibility of a plurality of reflection surfaces. It is a further object of the present invention to present a method of enlarging the object field of visibility of a mirror device without causing incorrect perception to the observer of the object distance and size. It is another object of the invention to provide a means wherein the object fields of visibility of the individual reflecting surfaces are combined without discontinuity or overlap. It is also an object of the invention to provide the observer the means to visually distinguish an image seen with the mirror device and promptly relate the image with the object field of visibility of the respective reflector wherein the object is located. It is yet another object of the invention to present an automobile view mirror composed of two or more mutually-inclined reflecting surfaces having a surface area not exceeding the surface area of one individual reflector and providing a combined object field of visibility without overlap or discontinuity, also without affecting the perception of the driver of the correct distance and size of the object, wherein the image produced by anyone reflector is visually identified and promptly related with the object field of visibility of the respective reflector generating the image.

The mirror device of the present invention, with features as aforesaid, is realized by an appropriate combination of a plurality of simultaneously-functioning partially-reflecting surfaces of predetermined coefficients of reflection, suitably oriented relative to one another, with transparent media of predetermined refractive indices occupying the spaces between adjacent reflecting surfaces. The reflection from any individual surface can be made identifiable with the surface generating the said reflection and the related object field of visibility through distinct features of the image that are related to the individual reflecting surface. In one mode of the invention, two or more plane reflecting surfaces are positioned one behind the other at small angles of mutual inclination, of which the rearmost is totally reflecting and the rest are partially reflecting so that the incoming light is divided at the front, partly reflected and partly transmitted. The light transmitted from one partially-reflecting surface is incident on the reflecting surface behind it. All the surfaces function simultaneously. If the medium between two reflecting surfaces is vacuum or air, the object fields of visibility related to the two surfaces will bear a mutual shift twice the angle between the surfaces. If a transparent medium, fluid or solid, of refractive index n greater than 1 fills the space between the reflecting surfaces, the shift between the direction ranges will be larger yet by another factor that depends on the angle of incidence. When the angle of incidence is small, this factor of increase will be n.

In combining the object fields of visibility of a plurality of reflectors, discontinuity and overlap have to be avoided, as discontinuity leads to regions of invisibility and overlap leads to multiple images for a single object and consequent confusion to the driver. The object fields of visibility of two adjacent reflecting surfaces can be made continuous and without overlap by selection of an appropriate angle of inclination $\Delta$ between the surfaces and selection of a material for the medium between the surfaces having an appropriate refractive index n. The product $2\Delta.n$ determines by and large the shift between the object fields of visibility presented by the two surfaces. With the actual geometries of the mirror and observer positions taken into account, the incident light direction of maximum divergence presenting object visibility for reflection from one surface can be made to coincide with the direction of minimum divergence presenting object visibility for reflection from the other, so that the object fields of visibility presented by reflection from the two surfaces can have continuity without overlap or interruption.

In superposing the reflections of two mutually-shifted object fields of visibility into the fixed image field of view of a particular mirror-observer geometry, a relative directional tilt will appear between the reflection images of the two object fields of visibility. In an actual device, for example, a road view mirror, this tilt will show up as a deviation in the directional orientation of the image, the orientation being related to the reflector surface generating the image. The directional orientation of the image can hence enable the viewer to visually distinguish an image formed by reflection from any particular reflecting surface and relate it to the object field of visibility of the said reflector. Distinguishing the image and identifying it with the respective reflecting surface and the related object field of visibility can be accomplished alternately by any of a number of special means. One such means can be to regulate the thickness of the coating applied to the surface to produce partial reflection. The film of coating material so deposited will produce interference effects between the components of light reflected at the two sides of the thin reflector film, the interference effect being varied for the different wave lengths that constitute the incident light. The image formed by reflection from such a partially-reflecting surface will hence have a distinct color that depends on the refractive indices of the media on either side of the reflector film and on the range of values of the ratio of the optically-equivalent thickness of the film to the wave length, expressed as $n_0 t_0/\lambda$, wherein $n_0$ represents the refractive index of the material medium of the reflector film, $t_0$ the thickness of the film, and $\lambda$ the wave length of the varied color components of the incident light. The coloration thus injected into the image field of view of the observation mirror will create a corresponding coloration for any image observed. The presence of a thin uniform film of air between two adjacent surfaces forming a reflecting interface can also produce a distinct color for the image field of view through the interference effect, the color being dependent on the thickness of the air film. The air film can be substituted by a film of a transparent material, such as mylar. In actual practice, wherever it is necessary to seperately regulate the reflection coefficient and the color of reflection, a combination of films of at least two materials, one that is a reflector and the other that is transparent can be required. The optically-equivalent thickness of such a combination of films of two different types is $(n_0 t_0 + n_a t_a)$ wherein $n_a$ represents the refractive index of the transparent film, which could be of air or other transparent medium, and $t_a$ its thickness. At a surface of total reflection, the color effect due to interference can be produced if a thin layer of transparent material of predetermined thickness and refractive index distinct from the refractive index of the transparent medium of the mirror slab is interposed between the slab and the silvering of the rear surface. Correlating an image with the reflector surface generating it can be accomplished also by taking advantage of the fact that the relative intensities of reflections from different surfaces can be controlled as desired by regulating the reflection coefficient while silvering. It can also be done alternately if the image field of view related to reflection from this surface can be marked with some predetermined characteristic, such as the presence of striations in the image field of view. This can be made possible, for example, if the depositing of reflector material on the surface is in the form of a series of parallel stripes, with nonreflecting small gaps in between the reflecting stripes. The reflector deposition may be done alternately in other identifying patterns as well. A still another possible method for achieving the purpose will be to form the reflecting surface with a distinct contour; such as an obtuse-angled sawtooth or a smooth low-profile wave corrugation. Such a formation of the reflecting surface can produce corresponding patterns in the image field of view.

The invention can be had in any of a number of varied modes; for example, as a stack of obtuse-V shaped transparent slabs having polished mirrored interfaces of predetermined coefficients of reflection, the said slabs having such cross sections that they can be positioned to be in mutual physical contact so as to comprise a compact assembly without gaps in between. The two obtuse-V shaped surfaces, the inner and the outer, of each slab shall have the obtuse V angles mutually different by a small extent. The V angle of the inner surface of one slab shall be equal to the V angle of the outer surface of the adjacent slab in the assembly of the slabs, so that the slabs fit one to the other forming a stack presenting obtuse-V shaped interfaces without gaps between the slabs. The optical contact between the surfaces of adjacent slabs forming an interface can be improved with optical coupling medium such as transparent silicon-based grease or glue of known index of refraction that is commercially available for similar purposes. Since the obtuse V angle varies in predetermined discrete steps from one interface to the next in the assembly, the adjacent surfaces of the assembly are oriented at predetermined mutual inclinations. In another mode, the V-shaped slabs can be substituted by wedge-like sheets of predetermined wedge angles, with the surfaces prepared to have predetermined coefficients of reflection. Other variations are also possible. Medium of any transparent material, clear or colored can be used. Sizes and shapes can be varied to suit different purposes. Provision can be made to enable variation of the angle between reflecting surfaces. Different methods of enabling reflection may be employed. For example, the conventional methods of silvering or mercury deposition or metallic-coated films may be used for mirroring. The mirroring can be permanent or replaceable. Protective coverings for the mirroring can be provided. The protective covering for the front reflecting surface may be a sheet of plane glass or other transparent material. Means may be provided to adjust the reflecting length of the mirror to a desired extent. The angle between the reflecting surfaces can be a constant or vary along the surfaces, smoothly or by regions. In applications wherein a realistic perception of the distance and size of the object by the viewer is not required, one or more of the plane reflecting surfaces can be substituted by curved surfaces.

In one particularly simple mode of the invention, only two plane surfaces, one on which the environmental light is incident directly and is hereinafter called the front surface and made to be partially reflecting with a predetermined coefficient of reflection and one rear surface made to be totally reflecting are involved, with the two surfaces oriented at a predetermined mutual inclination of a few degrees of arc, the medium being a transparent solid. This is made possible by coating the mutually-inclined major plane surfaces of a wedge-shaped sheet of glass or other transparent material, the front surface lightly in a regulated manner for partial reflection and the rear surface heavily for total reflection. The intensities of the two reflections can be made to be roughly the same or of any required ratio by regulating the coefficient of reflection of the frontal surface while it is silvered for partial reflection. By proper choice of the material medium and the wedge angle, as afore-described, the object fields of visibility related to the two reflecting surfaces can be made to supplement each other without discontinuity or overlap. Because plane reflectors are used, the perception of the driver on object distance and size is not affected. Distinguishing between the images produced by reflections from the two surfaces can be done by one or more of the means aforesaid.

The wedge-shaped double-reflecting plane-sheet mirror with features as described and means provided as aforesaid can be used as an automobile view mirror. It is mounted on the autobomile body inside a mirror box so that the reflecting surfaces remain to be approximately vertical planes at a small angle of mutual inclination, defined according to rotation about a vertical line, this angle being equal to the wedge angle.

Variations in a number of aspects are possible. The lengths of the reflecting surfaces may be varied by a finite extent. This may be done, for example, by means of a vertically held strip of opaque material that may cover the front reflecting surface partially, and may be slided across the front reflecting surface along the length of the mirror and moved partially or entirely into the frame of the mirror box as desired. Provision may be made to vary the angle of orientation of the reflecting surfaces relative to the automobile body. Modifications can be made to suit the device for view while fixed in any required position on the body of the automobile, including modifications to enable a left-side view, a right-side view or a rear view. The wedge-shaped sheet may be replaced by one or a combination of two or more transparent slabs of an obtuse-V shape or of other one or more predetermined shapes with mutually inclined surfaces of predetermined coefficients of reflection.

The variations stated herein and other similar variations known in the art may be construed as within the scope of the present invention.

BRIEF DESCRIPTION OF THE DRAWINGS

FIGS. 5.1 to 5.8 illustrates the directions of light transmission from the extreme right and left ends of the front and rear reflecting surfaces of the side-view mirror of the invention, directed towards the left and right eyes of the driver, consequently presenting the ranges of direction visible to the driver through the side-view mirror, mounted according to the geometry represented by FIG. 4.

DETAILED DESCRIPTION OF A PREFERRED EMBODIMENT

The present invention will now be described more fully hereinafter with reference to the accompanying drawings, in which a preferred embodiment of the invention is shown as FIG. 3. The invention may, however, be embodied in different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
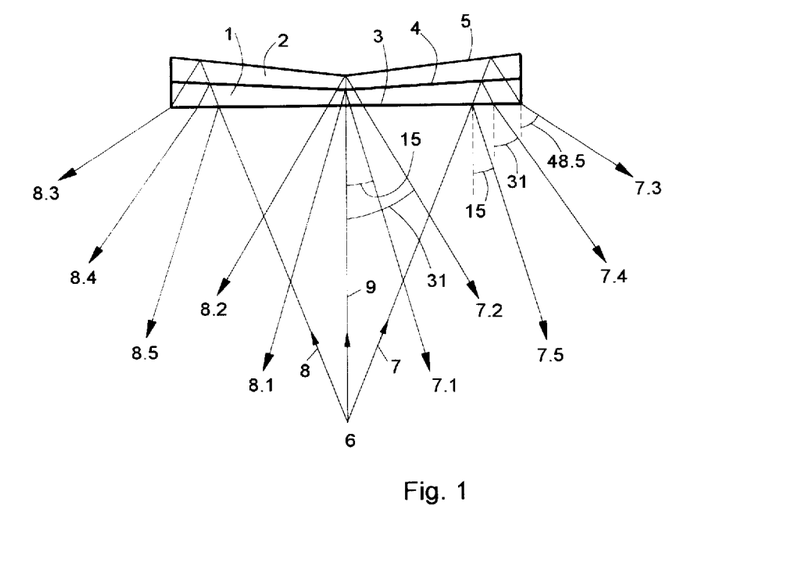
FIG. 1 is a plan view of a mirror device comprising a plurality of plane reflecting surfaces, illustrating the widened directional range of view made available by the device.

The method of widening the directional range of view through a stack of plane reflection surfaces is illustrated by FIG. 1. It also illustrates that the widening of the directional range can be made possible without discontinuity in the image field of view and without overlap so that no blind region is left within the field of view and formation of multiple images of a single object is avoided. Also, with the surfaces of reflection planar, the viewer's perception of object distance and size is not compromised. The figure represents the plan view of a stack of two obtuse-V shaped slabs 01, and 02 of clear glass of refractive index 1.5. It presents three reflecting surfaces 03, 04, and 05. The surface 03 is planar, whereas 04 and 05 each comprises two planes joining at large obtuse angles. The obtuse angles herein are 170° and 160° respectively. The divergent directions of light originating from point 06 illustrate the enlarged directional range of view available to an observer located at point 06. The line 09 defines the central direction. The range of directions available for view to the observer at point 06 is significantly larger than the range (0°±15°) having boundaries defined by the directions 07.5 and 08.5, made available by reflection from the front plane surface 03. With the angles of incidence being in the range (0°±15°) according to the geometry of the figure, the angle of inclination 5° between adjacent reflecting surfaces and the refractive index 1.5 of the glass medium are appropriate to provide a continuous directional range of view without overlap. The reflections from the surface of interface 04 are in the range ±(15° to 31°), as defined by rays 07.1 and 07.4 on the right and 08.1 and 08.4 on the left. These rays are the result of refraction of incident light at surface 03 into glass and subsequent reflections at surface 04 on the right and on the left. Similarly, the reflections from surface 05 are in the range ±(31° to 48.5°) as defined by rays 07.2 and 07.3 on the right and 08.2 and 08.3 on the left.

Figure 2:
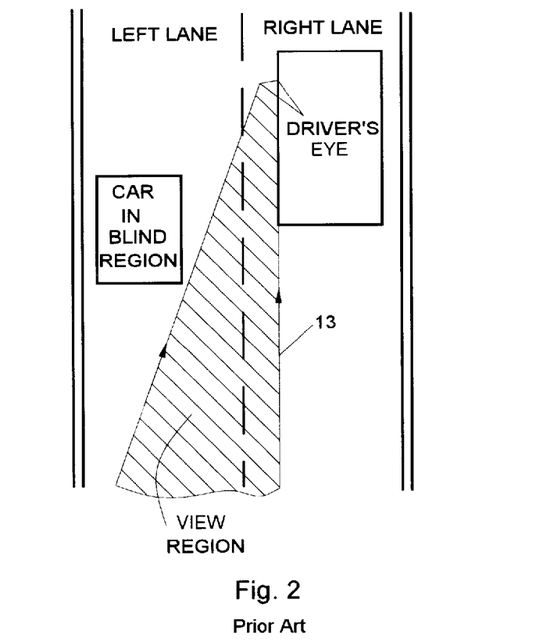
FIG. 2 is an illustration of the limited side view that an automobile driver has access to while using a conventional single-plane side-view mirror currently available in the market.

The inadequacy of the conventional single-plane automobile side-view mirror and the desirability of accomplishing an enlarged directional range of view is illustrated by FIG. 2, wherein a conventional side-view mirror is in place. The visibility region and the blind region are drawn.

Figure 3:
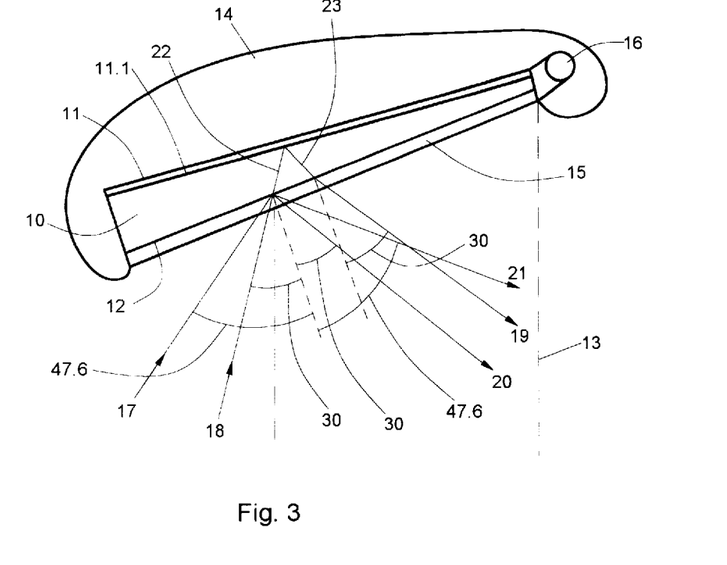
FIG. 3 is an illustration of the plan view of a divided-reflection wide-angle side-view automobile mirror, a preferred mode of the present invention.

A preferred embodiment of the present invention that can be used as an automobile side-view mirror is illustrated in FIG. 3. It comprises of a mirror device, a suitable mounting and operating mechanism. The mirror device is in the form of a thin wedge-shaped plate 10 of heavy flint glass, rectangular, of length 15 cm and height 9 cm, silvered (reflector-coated) on the two major flat surfaces 11 and 12 to have predetermined coefficients of reflection. Means are provided for securing a combined object field of visibility without discontinuity and without overlap and for visually identifying any viewed image with the reflection surface generating the image and the corresponding object field of visibility. The angle between the flat surfaces of the slab, the wedge angle, is 4.5°. The thickness of the slab is 3 mm at the thinner end of its length and 14.8 mm at the other end. A value 1.65 for the refractive index is assumed herein. The mirror is mounted on the left side of the automobile body with the thinner end of the glass slab on the right, with both reflecting planes being roughly vertical. The front surface of the glass wedge is oriented at a 72° turn about a vertical axis from the vertical plane tangential to the left side of the auto body marked 13 in the Figure, hereinafter called the automobile body line. The glass slab 10 is held in position inside a box 14, open in the front, which shall provide protection in the rear from mechanical damage, dust and moisture. The partially-reflecting front surface 12 of the slab 10 is covered and protected by means of a plane transparent sheet of glass 15 of thickness 3 mm. It is assumed herein that the automobile is left-hand driven, and the invention is used for viewing the side of the road on the left of the automobile. Provision is made to allow the rotation of the mirror piece within the box about a nearly vertical axis marked 16 in the figure, so that the driver could adjust the view angle manually or electrically. The coating of the front reflector surface 12 is such that the reflection coefficient is approximately 0.38. It is assumed for simplicity of discussion that this reflection coefficient is independent of the angle of incidence of light on surface 12, provided the angle of incidence is smaller than about 45°. The rear surface 11 is mirrored heavily to provide for total reflection. Rays of light 17 and 18 illustrate how light arriving from two divergent directions can be reflected from the front and rear reflection surfaces into close parallel directions 19 and 20 towards an eye of the driver. These rays 17 and 18 are mutually divergent by 17.6°. Roughly 38% of the intensity of the ray 17 is reflected off along direction 21 from the front surface 12. Rest of the light, 62% is refracted into the glass along the direction marked 22 and totally reflected from the rear surface 11 along direction 23. Ray 23 will be partially, approximately 38%, reflected off at surface 12 back into the glass slab 10, and the rest, roughly 62%, refracted into air outward along direction 19. Ray 19 will have intensity roughly 62% of ray 23, equal to 38% of ray 17. Ray of light 18 also undergoes reflection and refraction at the surface 12. The direction of the light that is so reflected from the front surface 12 is marked 20. It is readily seen that under the conditions described, rays 19 and 20 will be of roughly equal intensity provided 17 and 18 are of equal intensity. The ray of light 21 resulting from reflection of ray 17 at surface 12 is directed into the air at an angle of divergence 17.6° from the directions of rays 19 and 20. Since 19 and 20 are directed towards the eye of the driver, the ray 21 is directed away from the eye.

The identification of an image seen in the image field of the mirror device with the reflecting surface generating it and the related object field of visibility can be done according to the aforesaid directional tilt of the image. Additional means that supplement are provided for herein; identification by color. The reflector film of the rear is formed with a double layer of two distinct materials, $MgF_2$ and standard silvering. The coating of $MgF_2$, a transparent reflector material of refractive index 1.38, marked 11.1 in the Figure, is interposed between the glass medium 10 and the rear surface silvering 11 of total reflection. The thickness of the $MgF_2$ layer shall be approximately 0.1 micron, so that, at the angles of incidence of light encountered in the driving situation as aforesaid, the reflections from the rear can provide a pinkish tint to the image field of view.

Figure 4:
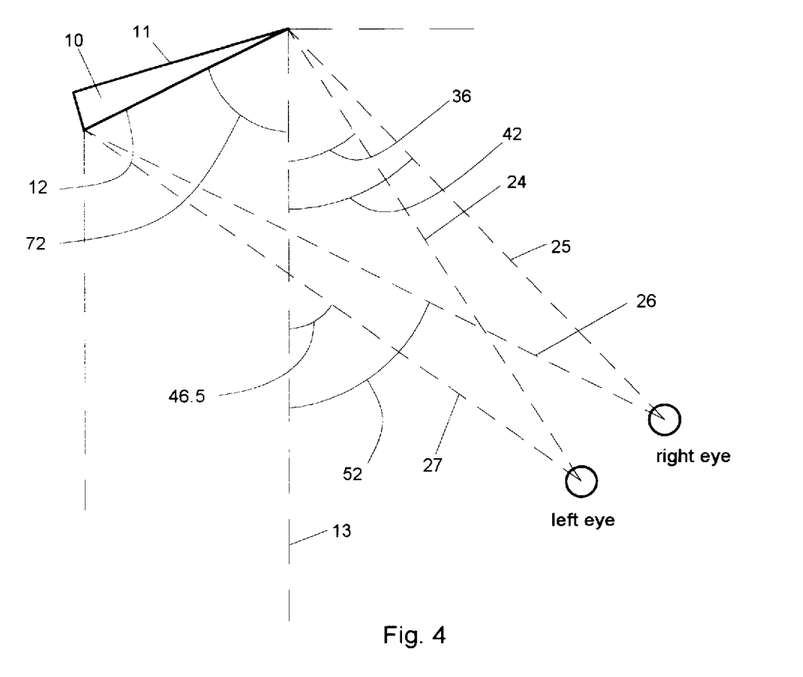
FIG. 4 is a geometrical illustration marking a typical possible orientation of the divided-reflection wide-angle side-view mirror on the auto body and the viewing directions of the driver.

FIG. 4 is an illustrative drawing that represents the orientation and location of a side-view mirror on the left of an automobile as described by FIG. 3 and the typical positions of the automobile-driver eyes relative to the automobile body, and has been drawn to a linear scale. The left and the right eyes of the driver are marked. The extreme directions of image view by the driver into the mirror, via the left and right eyes separately, are drawn and marked as 24, 25, 26, and 27. The angle between the automobile body line 13 and a ray transmitted back into air from a point on the surface 12 after reflection or refraction of the incident light is hereinafter called the angle of transmission. The smallest and the largest transmission angles possible while the image of an object is visibile to the driver, according to the aforesaid extreme directions of observation are indicated. According to FIG. 4, the said smallest transmission angles of image view are 36° for the left eye, and 42° for the right eye. The said largest transmission angles of image view are 46.5° for the left eye, and 52° for the right eye. The full range of directions of image view by the driver in the mirror is hence defined by the transmission angle range 36° to 52°. The geometry of FIG. 4 is used in FIG. 5 to illustrate the two ranges of directions of view of the road accessible to the driver, owing to reflections from the front and rear reflecting surfaces, taking into account the full length of the mirror slab and the separate directional ranges of image view of the left and right eyes. The direction of view of a road object is defined in terms of the angle presented in the horizontal plane between the automobile body line 13 and the ray of light directed from the road object toward the mirror, hereinafter called the object angle. Accordingly, the object angle of visibility for light reflected from the front mirror surface 12 into the driver's left eye is in the range 0° to 10.5° as seen from FIGS. 5.1 and 5.3, and 6° to 16° for the right eye as seen from FIGS. 5.2 and 5.4. The corresponding ranges of the object angle of visibility for reflection from the rear surface 11 are 16° to 27.9° for the left eye as seen from FIGS. 5.5 and 5.7, and 22.7° to 34.6° for the right eye as seen from FIGS. 5.6 and 5.8. With 4.5° for the wedge angle and 1.65 for the refractive index, the two ranges of object angle of visibility corresponding to reflection from the two surfaces meet, with neither overlap or discontinuity. These results are tabulated below, along with the combined ranges.

|  | Object Angle of Visibility | | |
| --- | --- | --- | --- |
|  | Left eye | Right eye | Combined |
| Front reflection | 0° to 10.5° | 6° to 16° | 0° to 16° |
| Rear reflection | 16° to 27.9° | 22.7° to 34.6° | 16° to 34.6° |

Figure 6:
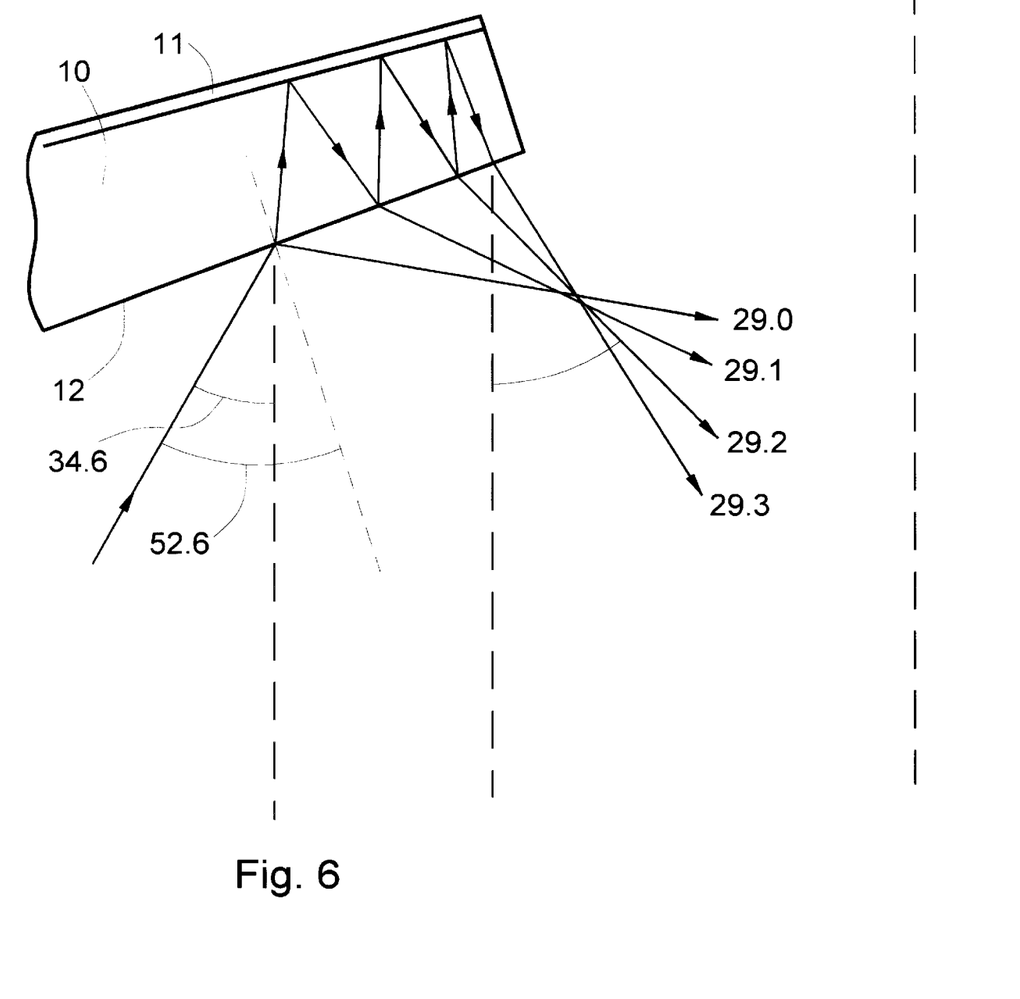
FIG. 6 is an illustration of the divergent directions of reflections of different orders from the rear surface.
Figure 55:
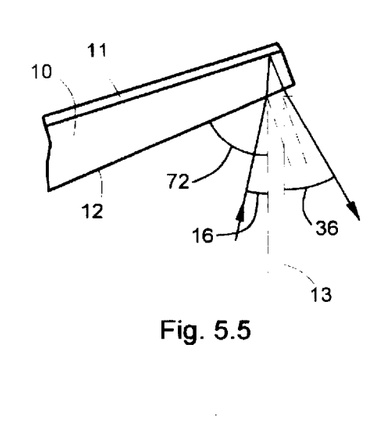
Figure 56:
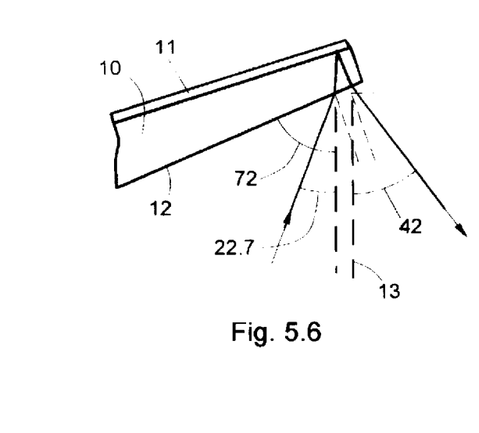
Figure 57:
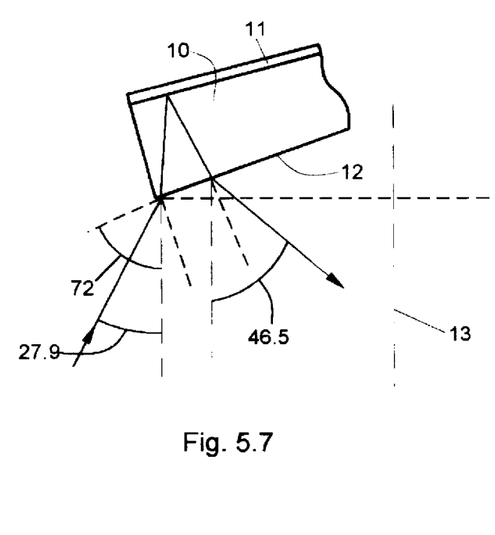
Figure 58:
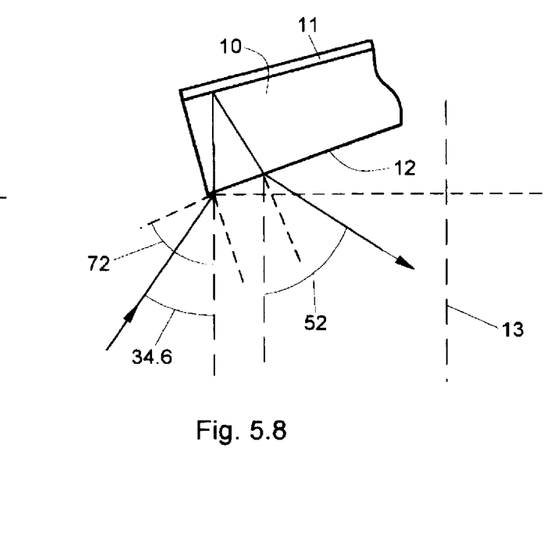

It is thus seen that the two directional ranges, 0° to 16°, and 16° to 34.6° correspond to the object fields of visibility for reflection from the front and rear surfaces respectively. In obtaining the range for the rear surface, reflections higher than of the first order have not been taken into account. The images formed by the first-order reflection from the rear surface and the reflection from the front surface which has a reflection coefficient 0.38 and seen in the image field of view of the driver will be of approximately the same intensity. Higher-order reflections from the rear surface, as illustrated by FIG. 6, may also produce visibility for objects positioned within certain ranges of directions. For these higher-order reflections, the object angles of visibility are larger than for first-order. This can be seen readily from FIG. 6, and FIGS. 5.5 and 5.7. In FIG. 6, light ray 29 emerging from a road object at the object angle 34.6° leads to ray 29.0 by reflection at the front surface 12, to ray 29.1 via first-order reflection at the rear surface 11, and to ray 29.2 via second-order reflection from surface 11, the said ray 29.2 being at 36° transmission angle and hence pointed toward the left eye of the driver, thus leading to object visibility. Following FIGS. 5.5, and 5.7, it is seen that object visibility for first-order reflection from the rear surface via the left eye occurs only for smaller object angles, the range of the object angle of visibility being 16° to 27.9°. The directional ranges of the object angle of visibility corresponding to the second-order reflection from the rear are calculated, and are given below for the two eyes separately, and combined.

| Left eye | Right eye | Combined range |
| --- | --- | --- |
| 34.6° to 52.4° | 43.8° to 72° | 34.6° to 72° |

It is therefore seen that the second-order reflection from the rear can lead to a further widened object field of visibility. The image formed by second-order reflection will however be less intense than that formed by first-order reflection. The intensity of image formation becomes feebler by a factor roughly 0.38 for every higher order. In actuality, the intensity of the image of an object situated in the object field of visibility of second-order reflection relative to that of the first order is less even further because of the larger angles of incidence on the frontal surface 12 that correspond to the larger object angles of visibility involved with the second-order reflections. The range of the said angle of incidence is 52.6° to 90°, corresponding to the aforesaid range of object angle of visibility 34.6° to 72° of the second order. It can be seen further by calculation, that third-order and higher-order reflections from the rear do not occur into the directions towards the eyes of the driver and do not hence give rise to visibility. This is seen also from FIG. 6, which shows that as the order of reflection from the rear increases, the direction of the transmitted ray tends to shift toward the left in the direction of the object. The minimum transmission angle of object visibility is 36°, whereas the maximum transmission angle possible with third-order reflection is 35°, which corresponds to the theoretical limit 90° for the angle of incidence.

Calculations presented above are valid for particular geometrical parameters as illustrated in FIG. 4, and should be construed as only demonstrative. For other geometrical situations, the calculations and results will vary. Also, in the discussions herein, factors having no major role in deciding the features and functioning of the device of the invention have been ignored.

Figure 7:
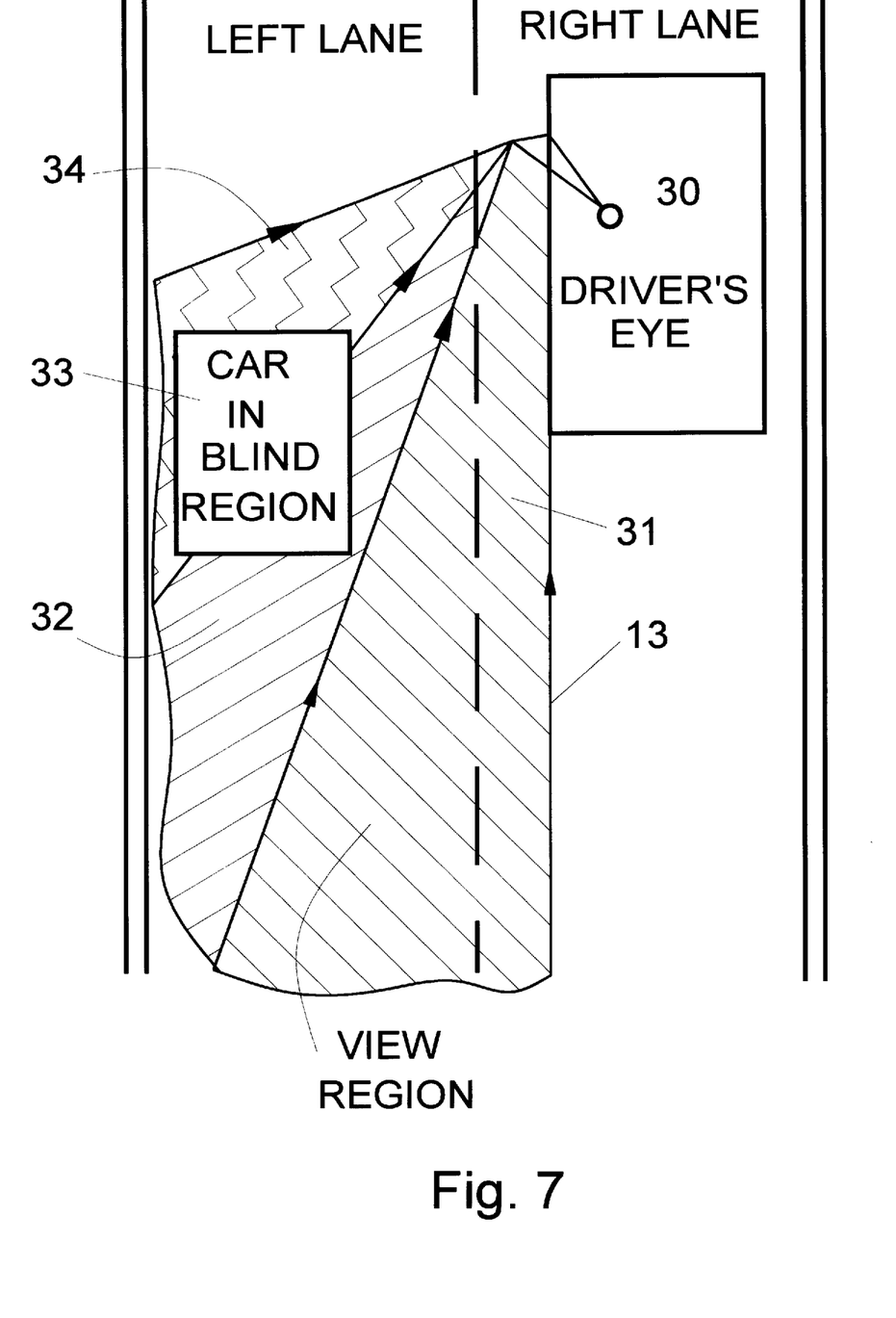
FIG. 7 illustrates the location of a side vehicle which cannot be seen in a single-plane side-view mirror currently available in the market, but can be seen in a divided-reflection mirror of the present invention.
Figure 51:
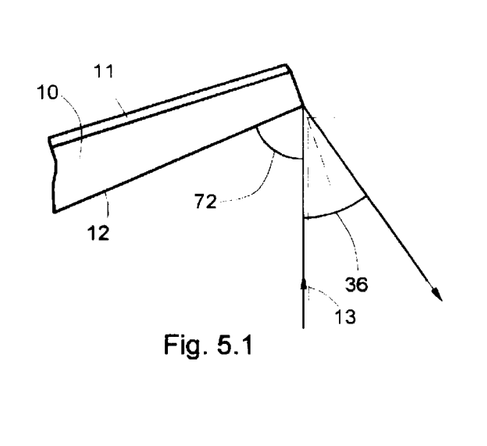
Figure 52:
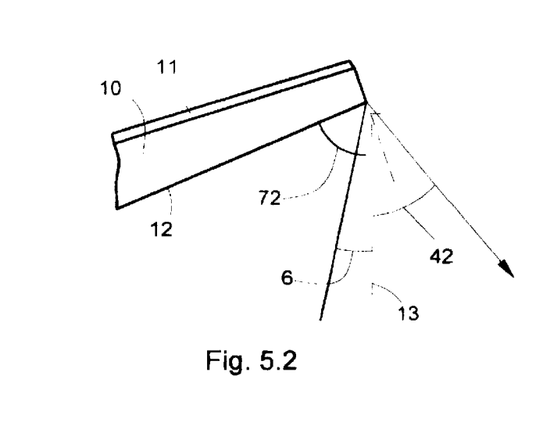
Figure 53:
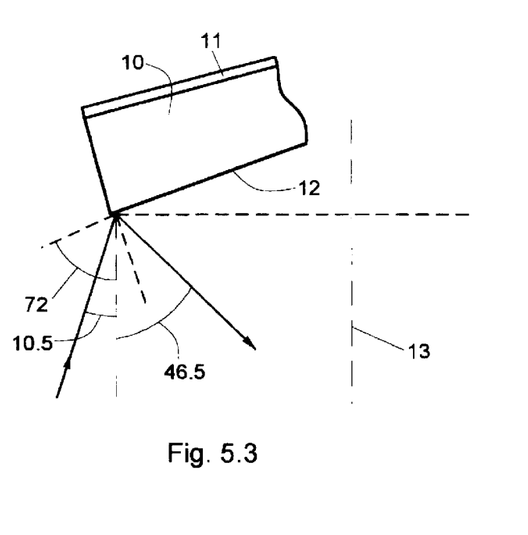
Figure 54:
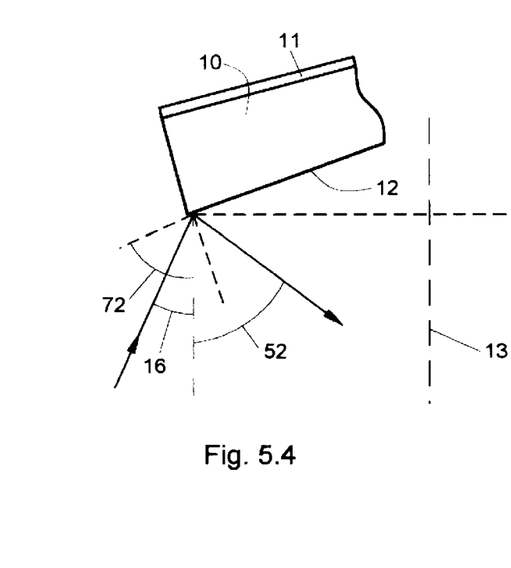

The advantage of the divided-reflection wide-angle view automobile mirror, as represented in FIG. 3, a preferred embodiment of the invention over the conventional single-plane mirror currently in vogue is illustrated in FIG. 7. With the said single-plane mirror, only the region 31 intervening between directions 13 and 28, corresponding to object angles 0° and 16° is visible to the driver of vehicle 30. Thus the vehicle marked 33 is not visible. With the device of the invention described above in use, the object visiblity on the side is extended to further include the region 32 intervening between object directions 28 and 29, accountable by reflections of first order from the rear surface. Thus vehicle 33 is clearly visible to the driver looking into the side-view mirror. Region 34 is also visible, but only with distinctly less intensity, as its visibility originates from reflections of second order from the rear. This region too may be expected to contribute to the image field of view a characteristic color effect. The invention has several advantages. It is a single-piece mirror, simple and compact, and an increased directional range of view is made possible without enlargement of the size of the mirror. The increase can be made possible without discontinuity or overlap. The seperate regions 31, 32, and 34 of the combined object field of visibility contribute characteristic colors to the image field. It is easy to mount the mirror on the auto body, without projecting outwards excessively. With the reflector surfaces planar, the viewer's perception of the size and distance of the object is not affected. Despite the apportionment of intensity due to divided reflection, the mirror can function effectively during day and night.

What is claimed:

1. A side-view mirror assembly for use on a side of an automobile, the mirror assembly comprising;

a box (14) having an open end;

a transparent wedge-shaped plate, the plate having a front flat surface and a rear flat surface;

a silvered coating on each of the front flat surface and the rear flat surface of the transparent wedge-shaped plate; and, a plane transparent sheet of glass;

the transparent wedge-shaped plate being secured in place by the open end of the box, and the plane transparent sheet of glass being secured to the front flat surface of the transparent wedge-shaped plate;

whereby a ray of light directed toward the wedge-shaped plate is both reflected and refracted off of the mirror assembly;

the silvered coating on the front surface of the wedge-shaped member has a reflection coefficient of approximately 0.38.

2. A side-view mirror assembly for use on a side of an automobile, the mirror assembly comprising;

a box (14) having an open end;

a transparent wedge-shaped plate, the plate having a front flat surface and a rear flat surface;

a silvered coating on each of the front flat surface and the rear flat surface of the transparent wedge-shaped plate; and, a plane transparent sheet of glass;

the transparent wedge-shaped plate being secured in place by the open end of the box, and the plane transparent sheet of glass being secured to the front flat surface of the transparent wedge-shaped plate;

whereby a ray of light directed toward the wedge-shaped plate is both reflected and refracted off of the mirror assembly;

a second coating of a transparent reflector material on the rear surface of the wedge-shaped plate in addition to the silvered coating; and, the transparent reflector material being a coating of $MgF_2$ with a refractive index of approximately 1.38.

3. The side-view mirror assembly of claim 2, and further comprising;

the thickness of the $MgF_2$ coating being approximately 0.1 micron.

4. A mirror comprising:

a transparent wedge-shaped plate;

the wedge-shaped plate having a flat front surface and a flat rear surface;

the front surface having a silvered coating thereon;

the rear surface having a silvered coating thereon such that light is totally reflected therefrom;

a glass sheet secured to the front surface of the wedge-shaped plate.

the wedge-shaped plate having an wedge angle between the two flats surfaces of approximately 4.5 degrees; and, the silvered coating on the front surface of the wedge-shaped plate having a reflection coefficient of approximately 0.38.

5. The mirror of claim 4, and further comprising;

the rear surface of the wedge-shaped plate having a second coating thereon, the second coating being a transparent reflector material.

6. The mirror of claim 5, and further comprising;

the transparent reflector material being $MgF_2$.

7. The mirror of claim 6, further comprising;

the $MgF_2$ coating being approximately 0.1 micron in thickness.

* * * * *